(12) United States Patent
Mesner

(10) Patent No.: US 9,145,978 B2
(45) Date of Patent: Sep. 29, 2015

(54) ADJUSTABLE FAIL-SAFE SUCTION STOP VALVE

(75) Inventor: Steven Mark Mesner, Tomah, WI (US)

(73) Assignee: Parker Hannifin Corporation, Cleveland, OH (US)

( * ) Notice: Subject to any disclaimer, the term of this patent is extended or adjusted under 35 U.S.C. 154(b) by 692 days.

(21) Appl. No.: 13/511,512

(22) PCT Filed: Nov. 23, 2010

(86) PCT No.: PCT/US2010/057730
§ 371 (c)(1),
(2), (4) Date: May 23, 2012

(87) PCT Pub. No.: WO2011/063375
PCT Pub. Date: May 26, 2011

(65) Prior Publication Data
US 2012/0241027 A1     Sep. 27, 2012

Related U.S. Application Data

(60) Provisional application No. 61/263,483, filed on Nov. 23, 2009.

(51) Int. Cl.
*F16K 31/40*     (2006.01)

(52) U.S. Cl.
CPC ......... *F16K 31/406* (2013.01); *Y10T 137/7838* (2015.04)

(58) Field of Classification Search
CPC .. F16K 31/406; F16K 31/40; Y10T 137/7838
USPC ........ 251/30.01, 62, 63.4, 63.5, 30.02, 30.03, 251/30.05, 31, 26; 137/512; 92/62
See application file for complete search history.

(56) References Cited

U.S. PATENT DOCUMENTS

| | | |
|---|---|---|
| 2,409,517 A | 10/1946 | Schmit |
| 2,596,036 A | 5/1952 | MacDougall |
| 2,745,254 A | 5/1956 | Malkoff |
| 3,002,527 A | 10/1961 | Bariffi |

(Continued)

FOREIGN PATENT DOCUMENTS

| | | |
|---|---|---|
| DE | 11 96 458 B | 7/1965 |
| EP | 1 186 784 A1 | 3/2002 |

(Continued)

OTHER PUBLICATIONS

International Search Report and Written Opinion for International Application No. PCT/US2010/057730 dated Mar. 9, 2011.

(Continued)

*Primary Examiner* — John K Fristoe, Jr.
*Assistant Examiner* — Andrew J Rost
(74) *Attorney, Agent, or Firm* — Thomas G. Fistek

(57) ABSTRACT

An adjustable fail-safe suction stop valve is provided for providing hot gas defrost in refrigeration applications. The dual position valve (10) utilizes a single solenoid (20) and a pair of check valves (60,62) in a configuration that allows the evaporator pressure to be internally equalized through the valve to an adjustable setting over the suction pressure after a defrost cycle has occurred. The intermediate stage allows for this equalization to occur in a controlled manner without the need for an equalization valve.

18 Claims, 5 Drawing Sheets

(56) References Cited

U.S. PATENT DOCUMENTS

| | | |
|---|---|---|
| 3,953,984 A | 5/1976 | Widdowson |
| 4,270,726 A | 6/1981 | Hertfelder et al. |
| 4,535,805 A | 8/1985 | Mertz |
| 4,651,535 A | 3/1987 | Alsenz |
| 5,070,707 A | 12/1991 | Ni |
| 5,299,592 A | 4/1994 | Swanson |
| 5,669,413 A | 9/1997 | Hegglin et al. |
| 6,000,231 A | 12/1999 | Alsenz |
| 6,244,561 B1 | 6/2001 | Hansen, III et al. |
| 6,332,496 B1 | 12/2001 | Takano et al. |
| 6,367,506 B1 | 4/2002 | Takagi et al. |
| 6,789,563 B2 | 9/2004 | Filkovski et al. |
| 7,461,515 B2 | 12/2008 | Wellman |
| 7,677,527 B2 | 3/2010 | Szymaszek |
| 2005/0006609 A1 | 1/2005 | Fukano |
| 2007/0284003 A1 | 12/2007 | Hansen |

FOREIGN PATENT DOCUMENTS

| | | |
|---|---|---|
| EP | 1906115 A1 | 3/2006 |
| EP | 1906114 A1 | 9/2006 |
| EP | 2105685 A1 | 9/2009 |

OTHER PUBLICATIONS

International Preliminary Report on Patentability dated May 30, 2012.

ADJUSTABLE FAIL-SAFE SUCTION STOP VALVE

CROSS REFERENCE TO RELATED APPLICATIONS

The present application claims the benefit of the filing date of U.S. Provisional Patent Application Ser. No. 61/263,483, filed Nov. 23, 2009, the disclosure of which is incorporated herein by reference in its entirety.

TECHNICAL FIELD

The present invention relates, in general, to a solenoid valve such as the type used in hot gas defrost in refrigeration applications, and in particular to an adjustable fail-safe suction stop valve.

BACKGROUND

Refrigerating systems operating at temperatures below freezing will require defrosting at one time or another. On systems operating below zero degrees Fahrenheit, one common method of defrost is known as hot gas defrost. During the hot gas defrost cycle, the liquid refrigerant (typically ammonia in larger systems) must be pumped out of the evaporator coil, and replaced with warm high pressure ammonia gas. The evaporator is essentially converted to a condenser during this cycle. Upon completion of the defrost cycle, the high pressure gas must be released from the coil back to the compressor suction line. The large volume of compressed gas and the high pressure differences between the evaporator coil and the suction line require the gas be released in a controlled manner to avoid the possibility of vapor propelled liquid in the system. Industry guidelines recommend the use of a small bleed down solenoid valve piped in parallel to the suction stop valve, or valves which open in steps. When incorporating a bleed down solenoid, the smaller valve is opened prior to the suction stop valve for a period of time to allow the pressure in the coil to bleed off gradually. This method is strictly based on time. The use of a bleed down solenoid can still result in problems if the bleed valve does not actually open, or the pressure does not bleed down to a safe level prior to opening the suction stop valve.

SUMMARY

At least one embodiment of the invention provides a valve assembly comprising: a valve body having spaced inlet and outlet ports separated by an intermediate valve seat in open communication with the inlet and outlet ports; a first piston reciprocal within a bore in the valve body, the piston including a valve member being adapted to sealingly mate with the valve seat; an adapter body secured to an open end of the bore in the valve body; a second piston reciprocal within a bore in the adapter body, the second piston having a portion adapted to extend into the bore in the valve body for contacting the first piston; a solenoid assembly operable to open and close a conduit connecting a source of pressurized gas to the bore in the valve body above the first piston and to the bore in the adapter body above the second piston; and a first check valve in the conduit positioned between the solenoid assembly and the bore in the adapter body above the second piston; a second check valve, the second check valve positioned in a pilot conduit above the second piston; wherein the first check valve opens and the second check valve closes when the solenoid assembly is energized; and wherein the first check valve closes and the second check valve opens when the solenoid assembly is un-energized, the second check valve adapted to close when an inlet pressure to the second check valve falls below the tension of a spring of the second check valve.

At least one embodiment of the invention provides a refrigeration valve assembly comprising: a valve body having spaced inlet and outlet ports separated by an intermediate valve seat in open communication with the inlet and outlet ports; a first piston reciprocal within a bore in the valve body, the piston including a valve member being adapted to sealingly mate with the valve seat; a biasing member for normally biasing the valve member away from the valve seat; an adapter body secured to an open end of the bore in the valve body; a second piston reciprocal within a bore in the adapter body, the second piston having a portion adapted to extend into the bore in the valve body for contacting the first piston; a solenoid assembly operable to open and close a conduit from a source of pressurized gas to the bore in the valve body above the first piston and to the bore in the adapter body above the second piston; and a first check valve in the conduit between the solenoid assembly and the bore in the adapter body above the second piston; a pilot conduit connecting the inlet and the bore in the adapter body above the second piston; a second check valve, the second check valve positioned in the pilot conduit above the second piston; wherein the first check valve opens and the second check valve closes when the solenoid assembly is energized; and wherein the first check valve closes and the second check valve opens when the solenoid assembly is un-energized, the second check valve adapted to close when the inlet pressure falls below an activation pressure of the second check valve and the activation pressure of the second check valve is adjustable.

BRIEF DESCRIPTION OF THE DRAWINGS

Embodiments of this invention will now be described in further detail with reference to the accompanying drawings, in which.

DETAILED DESCRIPTION

Figure 1:
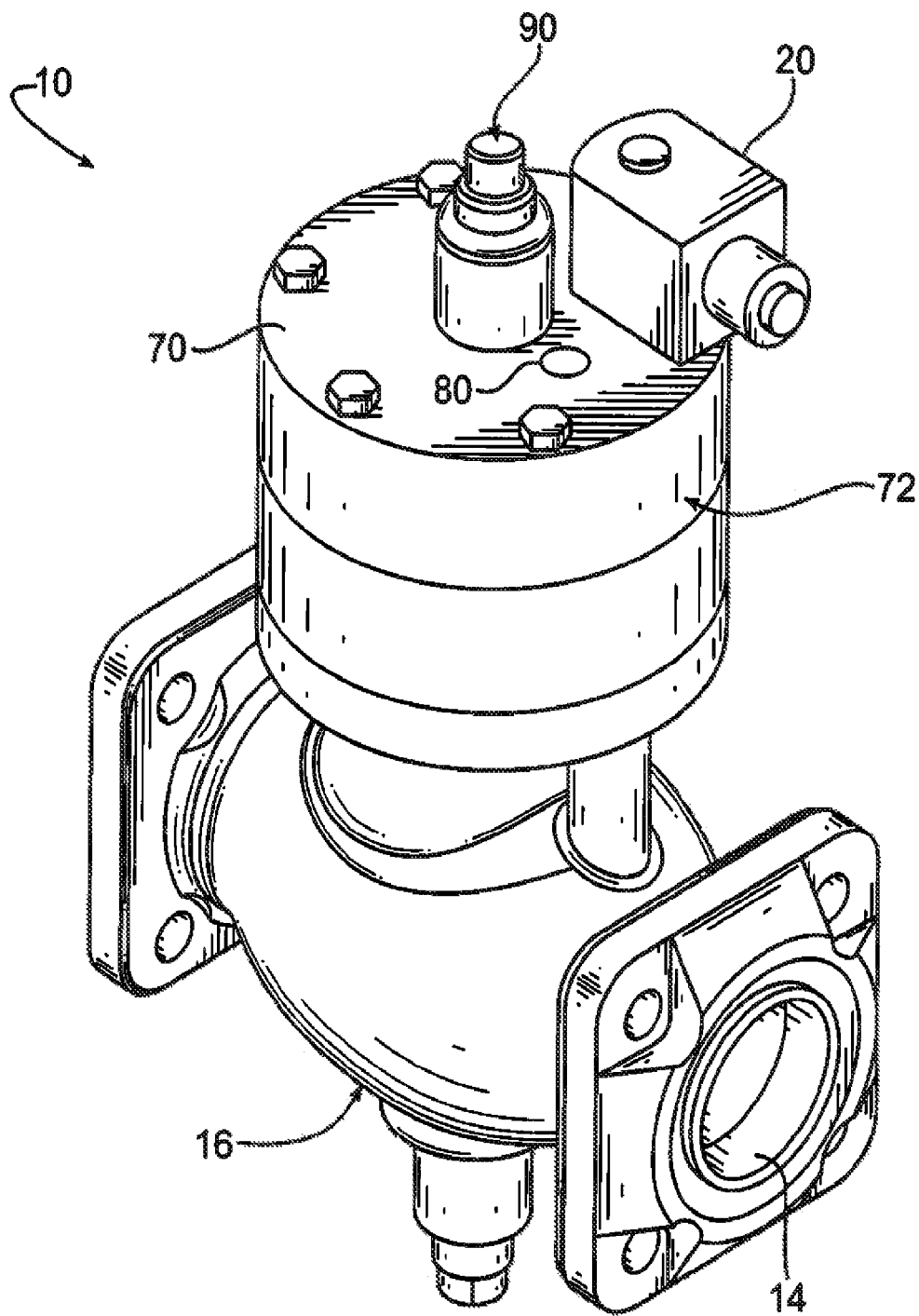
FIG. 1 is a perspective view of an embodiment of the valve in accordance with the present invention.
Figure 2:
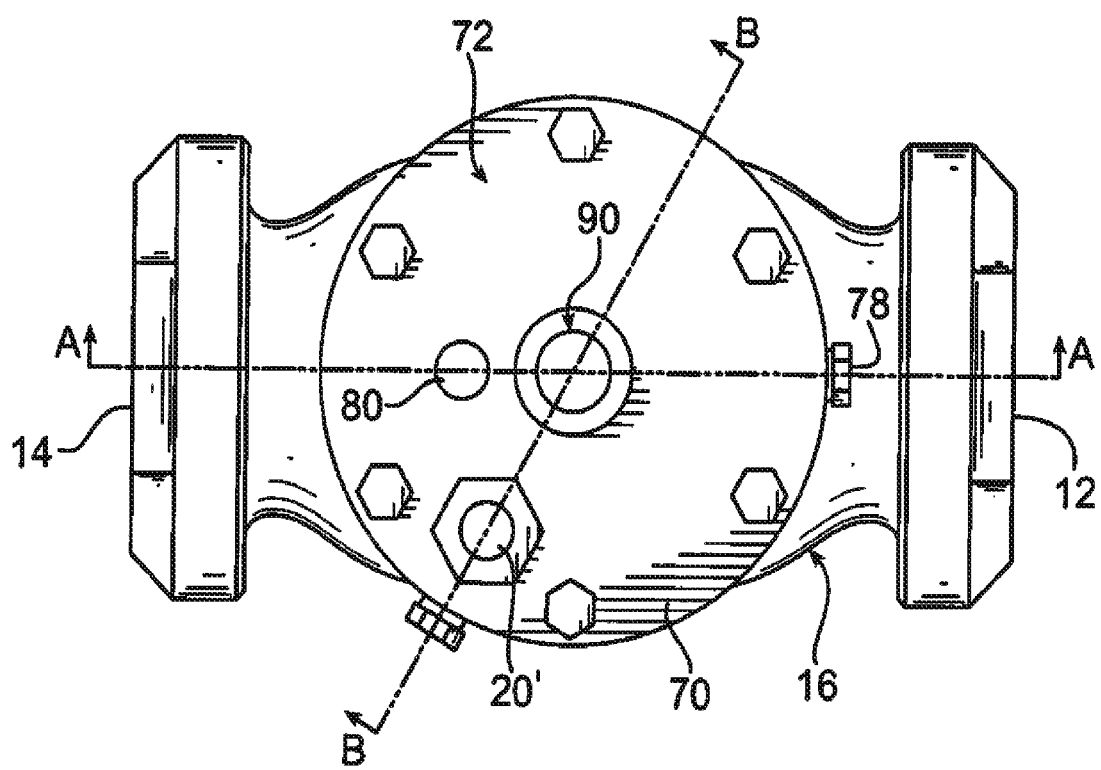
FIG. 2 is a top view of the valve of FIG. 1.
Figure 3:
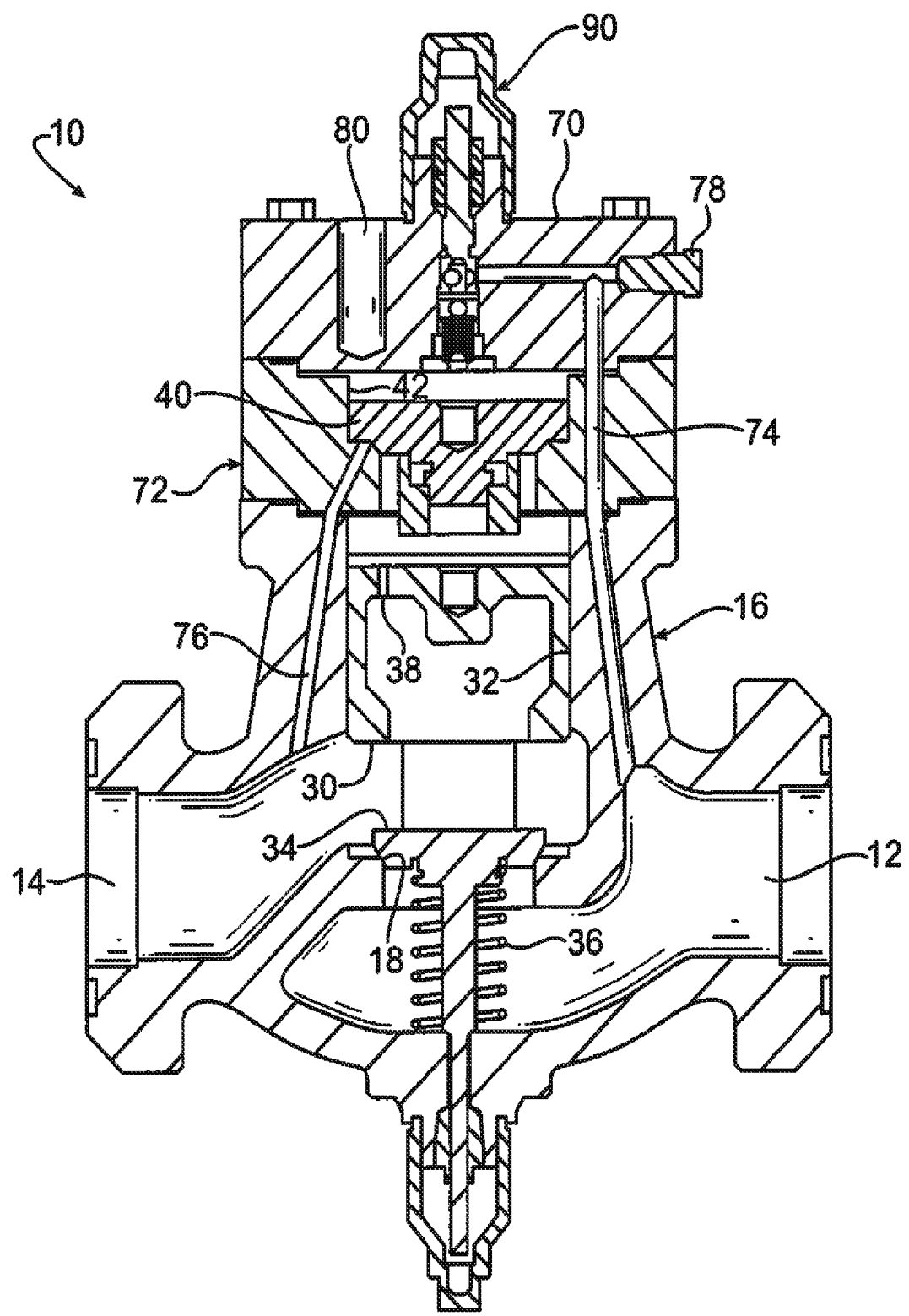
FIG. 3 is a cross-sectional view of the valve of FIGS. 1 and 2 taken along section line A-A in FIG. 2.
Figure 4:
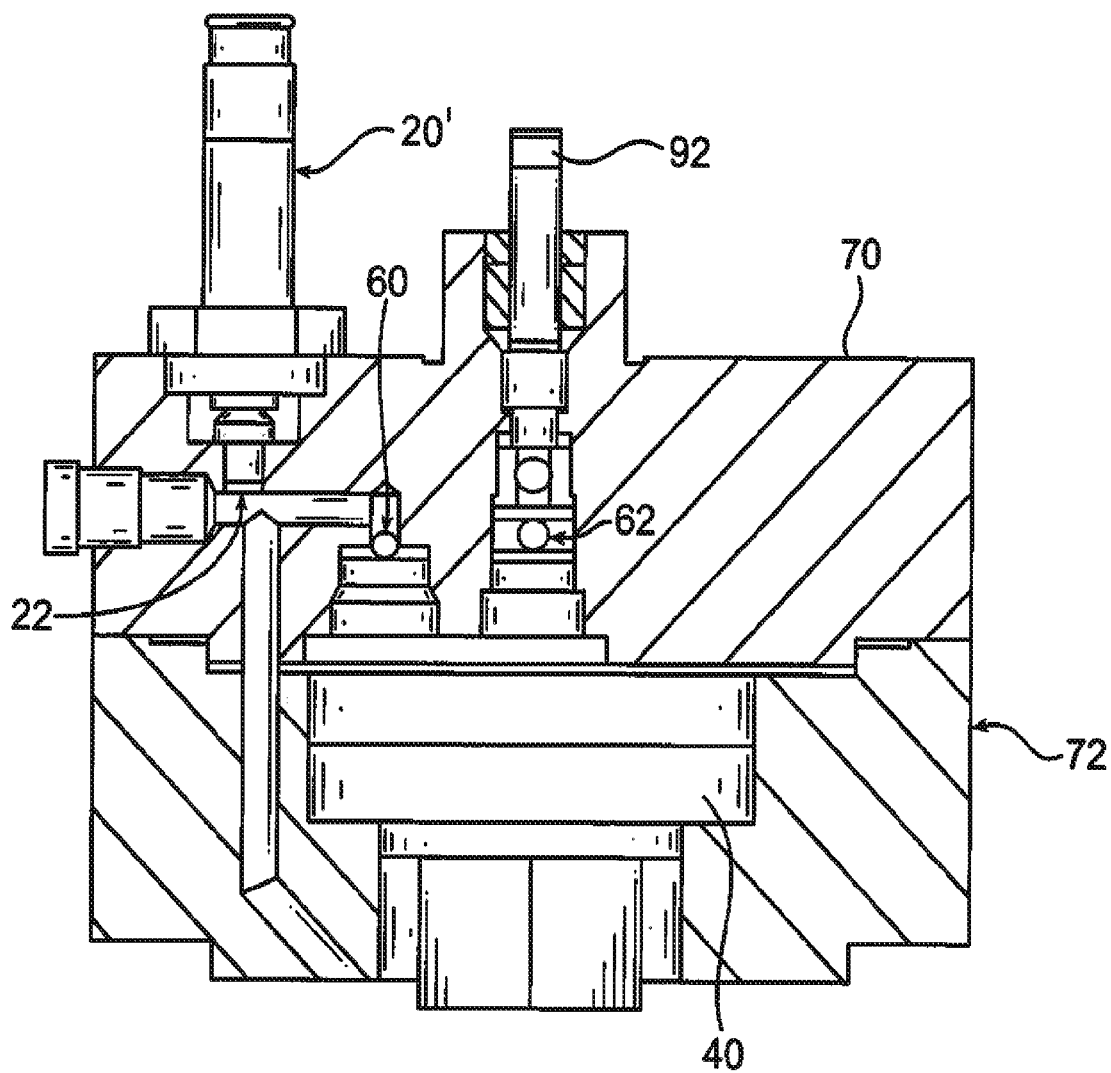
FIG. 4 is a partial cross-sectional view of the top portion of the valve of FIGS. 1 and 2 taken along section line B-B in FIG. 2.
Figure 5:
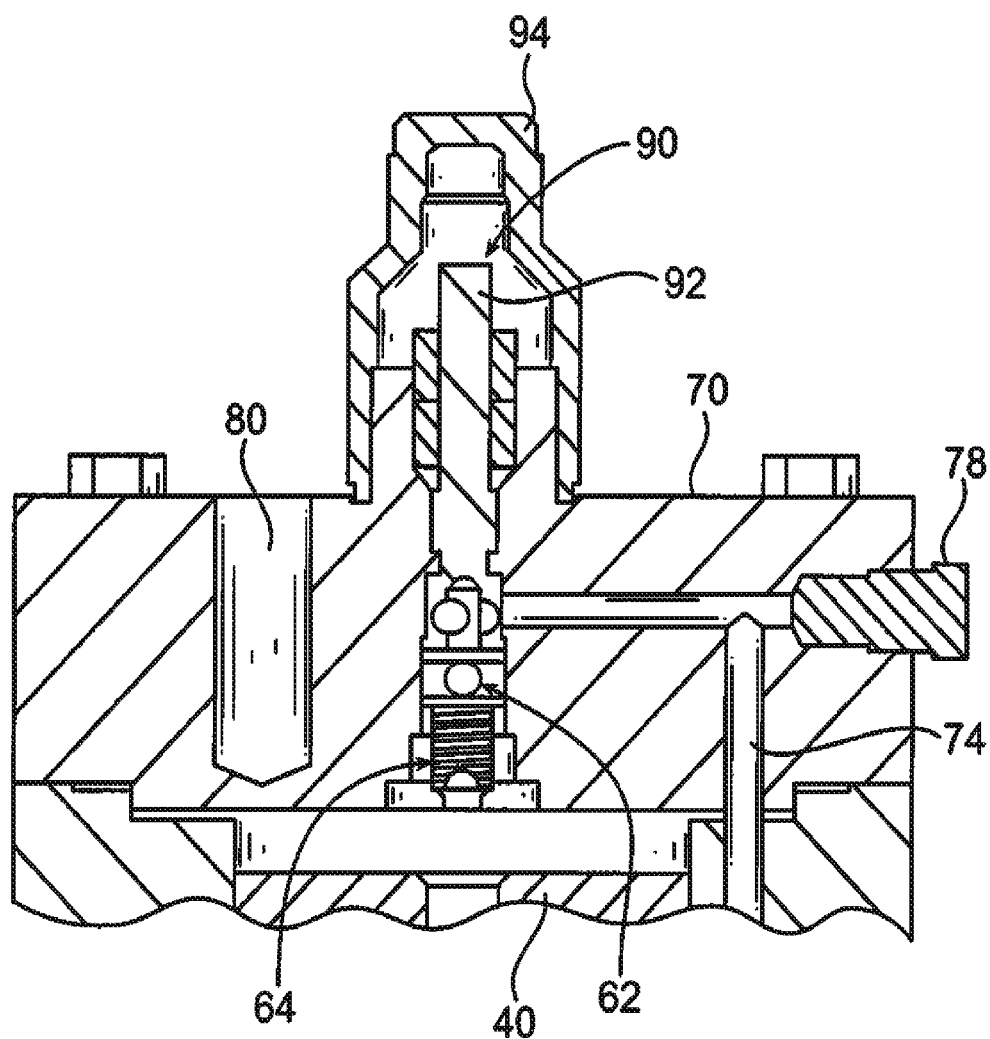
FIG. 5 is a detail view of the top portion of FIG. 3.

An embodiment of the present invention is shown in FIGS. 1-5 as an adjustable fail-safe suction stop valve 10 which comprises a stepped opening valve which incorporates an adjustable feature which prevents the valve from opening fully until a desired pressure is reached within the coil. The embodiment shown is an adjustable fail-safe suction stop valve 10 is a normally open, dual piston type stop valve. The valve 10 comprises a valve body 16 having spaced inlet 12 and outlet ports 14 separated by an intermediate valve seat 18 in open communication with the inlet 12 and outlet ports 14. The valve 10 further comprises a first piston 30 reciprocable within a bore 32 in the valve body 16, the piston 30 including a valve member 34 being adapted to sealingly mate with the valve seat 18. A biasing member 36 is positioned for normally biasing the valve member 34 away from the valve seat 18. An adapter body 72 including a top cover 70 is secured to an open end of the bore 32 in the valve body 16. A hot gas inlet 80 is shown in the top cover 70. The valve 10 also includes a second piston 40 reciprocable within a bore 42 in the adapter body 72, the second piston 40 having a portion 44 adapted to extend into the bore 32 in the valve body 16 for contacting the first piston 30. The portion 44 of the second piston 40 may be axially adjustable optimize the partial opening of the valve 10 when the second piston 40 is pushed fully downward toward the first piston 30. The first piston 30 includes a bleed hole 38 through a portion of the first piston 30 providing a fluid pathway connecting the valve body outlet port 14 to the bore 32 in the valve body 16.

A pilot conduit 74 extends from the inlet 12, the pilot conduit 74 (only partially shown) connectable to passageways to provide high pressure pilot gas to the pistons 30, 40 as discussed below.

A solenoid assembly 20 is operable to open and close a conduit 22 connecting the high pressure pilot gas from the conduit 74 (connection not shown) to the bore 32 in the valve body 16 above the first piston 30 and to the bore 42 in the adapter body above the second piston. A first check valve 60 is provided in the conduit 22 between the solenoid assembly 20 and the bore 42 in the adapter body 72 above the second piston 40.

A second check valve 62 is positioned along the central axis of the valve 10. The second check valve 62 is positioned between the pilot gas conduit 74 and the bore 42 in the adapter body 72 above the second piston 40. The second check valve 62 includes a biasing member 64 (shown as a spring) that has an adjustable tension created by an adjusting stem assembly 90 which allows the axial position of the stem 92 to be set at a particular spring tension. In the embodiment shown a portion of the stem 92 is threaded such that when it is rotated it can increase or decrease the spring tension—thereby controlling the activation pressure of the check valve 62. This allows the user to adjust the bleed down pressure for where the valve fully opens. In one example, the pressure is set between 5 psi and 40 psi over the suction pressure. The stem 92 protrudes from the valve 10 enabling external adjustment access. The stem assembly 90 may also include a cover 94. A gage port 78 may be provided with relation to conduit 74 to monitor coil pressure.

The valve 10 is closed by energizing the integral solenoid 20, which opens conduit 22 and supplies high pressure pilot gas to the top of both pistons 30, 40 forcing them closed. Pilot gas is fed directly to the main (lower) piston 30 through the pilot porting 22, while pilot flow to the secondary (top) piston 40 first passes through the first ball check 60, then directly onto the top piston 40.

Also at this time, the second ball check 62 in the top cover 70 closes and prevents the pilot gas feeding the secondary piston 40 from escaping upstream. The valve 10 stays in this position as long as the solenoid 20 is energized and pilot gas is supplied. As the defrost cycle progresses, pressure will build on the inlet side 12 of the valve 10 to a significantly higher value than that on the outlet side 14 of the valve 10.

At the end of the defrost cycle when the high pressure in the evaporator coil must be equalized, the solenoid coil 20 is de-energized. This terminates pilot gas flow to both pistons 30, 40. At this point the first ball check 60 closes and the second ball check 62 opens, this supplies high pressure gas from the evaporator coil to the secondary piston 40, holding it shut. The pressure on top of the main piston 30 bleeds out through the bleed hole 38 in the piston 30 creating a low pressure on top of the main piston 30, allowing it to open. The main piston travels upwards until it hits the bottom 44 of the secondary piston 40 which holds it in a partially open position. The high pressure gas in the evaporator coil can now bleed off through the main valve port 32 in a controlled manner. When the pressure in the evaporator can no longer overcome the adjustable spring tension in the second ball check 62, pilot flow to the secondary piston 40 is stopped. The gas on top of the secondary piston 40 bleeds out through the internal bleed 76 under the piston 40 and the main piston spring 36 can now push the valve fully open.

The key to the function of this valve is in the two ball check assemblies 60, 62. Working in sequence with each other they route pilot pressure from the appropriate location to the secondary piston 40 to hold it shut. They also prevent pilot pressure from being directed to the main piston 30 when the valve is in the equalizing position.

The hot gas solenoid valve 10 is a fail-safe valve because if pilot gas to the valve is disrupted in anyway, the valve will not open completely until the pressure in the evaporator has reached a safe level. The valve will go into the equalizing stage and allow the pressure in the evaporator to bleed off slowly.

Although the principles, embodiments, and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

The invention claimed is:

1. A valve assembly comprising:
   a valve body having spaced inlet and outlet ports separated by an intermediate valve seat in open communication with the inlet and outlet ports;
   a first piston reciprocal within a bore in the valve body, the piston including a valve member being adapted to sealingly mate with the valve seat;
   an adapter body secured to an open end of the bore in the valve body;
   a second piston reciprocal within a bore in the adapter body, the second piston having a portion adapted to extend into the bore in the valve body for contacting the first piston;
   a solenoid assembly operable to open and close a conduit connecting a source of pressurized gas to the bore in the valve body above the first piston and to the bore in the adapter body above the second piston; and
   a first check valve in the conduit positioned between the solenoid assembly and the bore in the adapter body above the second piston;
   a second check valve, the second check valve positioned in a pilot conduit above the second piston;
   wherein the first check valve opens and the second check valve closes when the solenoid assembly is energized; and
   wherein the first check valve closes and the second check valve opens when the solenoid assembly is un-energized, the second check valve adapted to close when an inlet pressure to the second check valve falls below the tension of a spring of the second check valve.

2. The valve of claim 1 wherein the first and second check valves are ball check valves that are biased toward a closed position by a spring.

3. The valve of claim 1 further comprising a stem which is moveable to adjust an activation pressure of the second check valve.

4. The valve of claim 3, wherein the stem extends from the valve and is externally accessible to adjust the activation pressure of the second check valve.

5. The valve of claim 1 further comprising a biasing member for normally biasing the valve member away from the valve seat.

6. The valve of claim 1 further comprising a bleed hole through a portion of the first piston providing a fluid pathway connecting the valve body outlet port to the bore in the valve body.

7. The valve of claim 1 wherein the valve has only a single solenoid valve.

8. The valve of claim 1 further comprising a gage port associated with the pilot conduit providing the ability to monitor the spring coil pressure of the second check valve.

9. The valve of claim 1, wherein the portion of second piston adapted to extend into the bore in the valve body is adjustable to optimize the partial opening of the valve when the second piston is pushed fully downward toward the first piston.

10. A refrigeration valve assembly comprising:
a valve body having spaced inlet and outlet ports separated by an intermediate valve seat in open communication with the inlet and outlet ports;
a first piston reciprocal within a bore in the valve body, the piston including a valve member being adapted to sealingly mate with the valve seat;
a biasing member for normally biasing the valve member away from the valve seat;
an adapter body secured to an open end of the bore in the valve body;
a second piston reciprocal within a bore in the adapter body, the second piston having a portion adapted to extend into the bore in the valve body for contacting the first piston;
a solenoid assembly operable to open and close a conduit from a source of pressurized gas to the bore in the valve body above the first piston and to the bore in the adapter body above the second piston; and
a first check valve in the conduit between the solenoid assembly and the bore in the adapter body above the second piston;
a pilot conduit connecting the inlet and the bore in the adapter body above the second piston;
a second check valve, the second check valve positioned in the pilot conduit above the second piston;
wherein the first check valve opens and the second check valve closes when the solenoid assembly is energized; and
wherein the first check valve closes and the second check valve opens when the solenoid assembly is un-energized, the second check valve adapted to close when the inlet pressure falls below an activation pressure of the second check valve and the activation pressure of the second check valve is adjustable.

11. The valve of claim 10 wherein the first and second check valves are ball check valves that are biased toward a closed position by a spring.

12. The valve of claim 10 further comprising a stem which is moveable to adjust the activation pressure of the second check valve.

13. The valve of claim 10 wherein the stem extends from the valve and is externally accessible to adjust the activation pressure of the second check valve.

14. The valve of claim 10 further comprising a biasing member for normally biasing the valve member away from the valve seat.

15. The valve of claim 10 further comprising a bleed hole through a portion of the first piston providing a fluid pathway connecting the valve body outlet port to the bore in the valve body.

16. The valve of claim 10 wherein the valve has only a single solenoid valve.

17. The valve of claim 10 further comprising a gage port associated with the pilot conduit providing the ability to monitor the spring coil pressure of the second check valve.

18. The valve of claim 10, wherein the portion of second piston adapted to extend into the bore in the valve body is adjustable to optimize the partial opening of the valve when the second piston is pushed fully downward toward the first piston.

* * * * *